(12) United States Patent
Ohno et al.

(10) Patent No.: US 11,912,002 B2
(45) Date of Patent: Feb. 27, 2024

(54) HEAT-SHRINKABLE MULTILAYER FILM AND HEAT-SHRINKABLE LABEL

(71) Applicant: GUNZE LIMITED, Ayabe (JP)

(72) Inventors: Naoki Ohno, Shiga (JP); Yusuke Onishi, Shiga (JP)

(73) Assignee: GUNZE LIMITED, Kyoto (JP)

( * ) Notice: Subject to any disclaimer, the term of this patent is extended or adjusted under 35 U.S.C. 154(b) by 0 days.

(21) Appl. No.: 17/628,052

(22) PCT Filed: Jun. 24, 2020

(86) PCT No.: PCT/JP2020/024729
§ 371 (c)(1),
(2) Date: Jan. 18, 2022

(87) PCT Pub. No.: WO2021/039072
PCT Pub. Date: Mar. 4, 2021

(65) Prior Publication Data
US 2022/0258458 A1 Aug. 18, 2022

(30) Foreign Application Priority Data
Aug. 30, 2019 (JP) .................................. 2019-158761

(51) Int. Cl.
*B32B 27/08* (2006.01)
*B32B 7/12* (2006.01)
(Continued)

(52) U.S. Cl.
CPC ................ *B32B 27/08* (2013.01); *B32B 7/12* (2013.01); *B32B 27/302* (2013.01); *B32B 27/36* (2013.01);
(Continued)

(58) Field of Classification Search
None
See application file for complete search history.

(56) References Cited

U.S. PATENT DOCUMENTS 10,773,502 B2 * 9/2020 Ishikawa ................. B32B 27/08
11,345,126 B2 * 5/2022 Onishi .................... B32B 27/08
(Continued)

FOREIGN PATENT DOCUMENTS

JP        2008-307896          12/2008
JP        2008-307896 A    *   12/2008
(Continued)

*Primary Examiner* — Vivian Chen
(74) *Attorney, Agent, or Firm* — Hamre, Schumann, Mueller & Larson, P.C.

(57) ABSTRACT

The present invention provides a heat shrinkable multilayer film that makes it possible to produce a heat shrinkable label having high seal strength regardless of interlaminar strength, and that also has excellent transparency. The present invention also provides a heat shrinkable label including the heat shrinkable multilayer film. Provided is a heat shrinkable multilayer film including: front and back layers each containing a polyester resin; an interlayer containing a polystyrene resin; and adhesive layers, wherein the front and back layers and the interlayer are stacked with the adhesive layers interposed therebetween, and the adhesive layers each contain a polyester resin having a glass transition temperature of 77° C. or lower.

2 Claims, 2 Drawing Sheets

(51) Int. Cl.
*B32B 27/30* (2006.01)
*B32B 27/36* (2006.01)
*G09F 3/00* (2006.01)
*G09F 3/02* (2006.01)
*C08L 67/03* (2006.01)
*C08L 25/08* (2006.01)
*C08L 67/02* (2006.01)
*C08L 25/10* (2006.01)
*B32B 7/04* (2019.01)
*C09J 125/08* (2006.01)
*G09F 3/04* (2006.01)
*C09J 167/02* (2006.01)
*C09J 167/03* (2006.01)
*B65D 65/40* (2006.01)

(52) U.S. Cl.
CPC ............. *G09F 3/0291* (2013.01); *B32B 7/04* (2013.01); *B32B 2250/05* (2013.01); *B32B 2250/24* (2013.01); *B32B 2250/40* (2013.01); *B32B 2270/00* (2013.01); *B32B 2274/00* (2013.01); *B32B 2307/30* (2013.01); *B32B 2307/414* (2013.01); *B32B 2307/736* (2013.01); *B32B 2325/00* (2013.01); *B32B 2367/00* (2013.01); *B32B 2519/00* (2013.01); *B65D 65/40* (2013.01); *C08L 25/08* (2013.01); *C08L 25/10* (2013.01); *C08L 67/02* (2013.01); *C08L 67/025* (2013.01); *C08L 67/03* (2013.01); *C08L 2203/16* (2013.01); *C09J 125/08* (2013.01); *C09J 167/02* (2013.01); *C09J 167/03* (2013.01); *C09J 2425/006* (2013.01); *C09J 2467/006* (2013.01); *G09F 3/04* (2013.01); *G09F 2003/023* (2013.01); *G09F 2003/0257* (2013.01); *G09F 2003/0273* (2013.01); *Y10T 428/1328* (2015.01); *Y10T 428/31786* (2015.04); *Y10T 428/31797* (2015.04); *Y10T 428/31909* (2015.04); *Y10T 428/31913* (2015.04); *Y10T 428/31917* (2015.04); *Y10T 428/31924* (2015.04); *Y10T 428/31931* (2015.04); *Y10T 428/31938* (2015.04)

(56) References Cited

U.S. PATENT DOCUMENTS

| | | | |
|---|---|---|---|
| 11,453,209 B2* | 9/2022 | Nozaki | B32B 7/028 |
| 11,642,875 B2* | 5/2023 | Ohno | B32B 27/302 |
| | | | 428/213 |
| 2008/0057236 A1* | 3/2008 | Yamada | C09J 7/29 |
| | | | 428/34.9 |
| 2009/0022916 A1* | 1/2009 | Yamada | B32B 7/12 |
| | | | 428/354 |
| 2016/0284248 A1* | 9/2016 | Banno | G09F 3/04 |
| 2017/0072668 A1* | 3/2017 | Ishikawa | B32B 27/36 |
| 2017/0095998 A1* | 4/2017 | Nakahara | C09D 133/12 |
| 2017/0190158 A1* | 7/2017 | Ishikawa | B32B 27/302 |
| 2021/0053327 A1* | 2/2021 | Nozaki | B32B 7/027 |
| 2021/0206147 A1* | 7/2021 | Ohno | G09F 3/04 |
| 2021/0308994 A1* | 10/2021 | Onishi | B32B 27/302 |
| 2022/0258458 A1* | 8/2022 | Ohno | B32B 27/08 |

FOREIGN PATENT DOCUMENTS

| | | | |
|---|---|---|---|
| JP | 2009-137294 | | 6/2009 |
| JP | 2009-137294 A | * | 6/2009 |
| JP | 2010-241055 A | * | 10/2010 |
| JP | 2010-264657 A | * | 11/2010 |
| JP | 2011-056736 A | * | 3/2011 |
| JP | 2010-241055 | | 7/2013 |
| JP | 2018-052560 | | 4/2018 |
| JP | 2018-052560 A | * | 4/2018 |

* cited by examiner

HEAT-SHRINKABLE MULTILAYER FILM AND HEAT-SHRINKABLE LABEL

TECHNICAL FIELD

The present invention relates to a heat shrinkable multilayer film that makes it possible to produce a heat shrinkable label having high seal strength regardless of interlaminar strength, and that also has excellent transparency. The present invention also relates to a heat shrinkable label including the heat shrinkable multilayer film.

BACKGROUND ART

Many recent containers such as plastic bottles and metal cans have heat shrinkable labels thereon. Heat shrinkable labels are produced by printing images and the like on a base film made of a heat shrinkable resin film.

Heat shrinkable labels often include polystyrene resin films because they have excellent low-temperature shrinkability. However, polystyrene resin films have insufficient heat resistance and solvent resistance. Polyester resin films, which have excellent heat resistance and solvent resistance, have also been used, but polyester resin films easily wrinkle when attached to a container because they rapidly shrink due to their poor low-temperature shrinkability. Many heat shrinkable labels have perforation so that heat shrinkable labels can be easily torn off from used containers for the recycling of the containers. However, polyester resin films are difficult to tear along the perforation.

To solve these problems, for example, studies have been conducted on multilayer films including front and back layers containing a polyester resin and an interlayer containing a polystyrene resin. A major issue for multilayer films is prevention of delamination.

To prevent delamination, adhesive layers have been formed between the front layer and the interlayer and between the back layer and the interlayer. Patent Literature 1 discloses a heat shrinkable multilayer film containing a rigid polyester resin as well as a flexible polyester resin, a flexible styrene resin, a rigid styrene resin, or a mixture thereof as adhesive resins of adhesive layers.

CITATION LIST

Patent Literature
Patent Literature 1: JP 2010-241055 A

SUMMARY OF INVENTION

Technical Problem

Heat shrinkable multilayer films are used as heat shrinkable labels, which are obtained by placing one end of the film on the other end to form a tubular shape and welding the overlapping portions by solvent sealing as shown in FIG. 1. Heat shrinkable labels are passed through a heating furnace to be shrunk with heat, and thus closely attached to containers such as plastic bottles.

During heat shrinking, the solvent seal portion receives stress due to shrinking. If the interlaminar strength is weak, the seal strength is insufficient, causing delamination at the solvent seal portion as shown in FIG. 2. The separation at the solvent seal portion may spread due to shrinking, causing appearance defects. Although the film disclosed in Patent Literature 1 can improve interlaminar strength, it does not sufficiently reduce separation at the solvent seal portion.

The present invention aims to provide a heat shrinkable multilayer film that makes it possible to produce a heat shrinkable label having high seal strength regardless of interlaminar strength, and that also has excellent transparency. The present invention also aims to provide a heat shrinkable label including the heat shrinkable multilayer film.

Solution to Problem

The present invention relates to a heat shrinkable multilayer film including: front and back layers each containing a polyester resin; an interlayer containing a polystyrene resin; and adhesive layers, wherein the front and back layers and the interlayer are stacked with the adhesive layers interposed therebetween, and the adhesive layers each contain a polyester resin having a glass transition temperature of 77° C. or lower.

The present invention is described in detail below.

The present inventors have found out that a heat shrinkable label having high seal strength regardless of interlaminar strength can be obtained by stacking front and back layers containing a polyester resin and an interlayer containing a polystyrene resin with adhesive layers interposed therebetween, with the adhesive layers containing a polyester resin having specific physical properties. The inventors also have found out that such a heat shrinkable label can have excellent appearance without a decrease in transparency. The inventors thus completed the present invention.

The heat shrinkable multilayer film of the present invention includes front and back layers and an interlayer.

The "front and back layers" as used herein means both the front layer and the back layer. The heat shrinkable multilayer film of the present invention has a structure in which the interlayer is interposed between the front layer and the back layer.

(Front and Back Layers)

The front and back layers each contain a polyester resin.

Examples of the polyester resin include those obtained by polycondensation of a dicarboxylic acid component and a diol component.

Examples of the dicarboxylic acid include terephthalic acid, o-phthalic acid, isophthalic acid, succinic acid, adipic acid, sebacic acid, azelaic acid, octylsuccinic acid, cyclohexane dicarboxylic acid, naphthalene dicarboxylic acid, fumaric acid, maleic acid, itaconic acid, decamethylene carboxylic acid, anhydrides thereof, and lower alkyl esters thereof.

Preferred dicarboxylic acids are terephthalic acid and isophthalic acid.

In 100 mol % of the dicarboxylic acid component, the lower limit of the amount of a component derived from terephthalic acid is preferably 50 mol %, more preferably 60 mol %, still more preferably 65 mol %, and the upper limit thereof is preferably 100 mol %.

In 100 mol % of the dicarboxylic acid component, the lower limit of the amount of a component derived from isophthalic acid is preferably 0 mol %, and the upper limit thereof is preferably 40 mol %, more preferably 35 mol %, still more preferably 33 mol %.

Examples the diol include: aliphatic diols such as ethylene glycol, 1,3-propanediol, 1,4-butanediol, diethylene glycol, 1,5-pentanediol, 1,6-hexanediol, dipropylene glycol, triethylene glycol, tetraethylene glycol, 1,2-propanediol, 1,3-butanediol, 2,3-butanediol, neopentyl glycol (2,2-dimethylpropane-1,3-diol), 1,2-hexanediol, 2,5-hexanediol, 2-methyl-2,4-pentanediol, 3-methyl-1,3-pentanediol, 2-ethyl-1,3-hexanediol, and polytetramethylene ether glycol; and alicyclic diols such as 2,2-bis(4-hydroxycyclohexyl)propane, adducts of alkylene oxide with 2,2-bis(4-hydroxycyclohexyl)propane, 1,4-cyclohexanediol, and 1,4-cyclohexanedimethanol.

Preferred among the diols are ethylene glycol, 1,4-butanediol, diethylene glycol, and 1,4-cyclohexanedimethanol.

In 100 mol % of the diol component, the lower limit of the amount of a component derived from ethylene glycol is preferably 40 mol %, more preferably 50 mol %, still more preferably 60 mol %, and the upper limit thereof is preferably 100 mol %.

In 100 mol % of the diol component, the lower limit of the amount of a component derived from diethylene glycol is preferably 0 mol %, and the upper limit thereof is preferably 40 mol %, more preferably 30 mol %, still more preferably 25 mol %.

In 100 mol % of the diol component, the lower limit of the amount of a component derived from 1,4-cyclohexanedimethanol is preferably 0 mol %, and the upper limit thereof is preferably 70 mol %, more preferably 60 mol %, still more preferably 50 mol %.

Preferred among the polyester resins are those containing a component derived from terephthalic acid as the dicarboxylic acid component and a component derived from ethylene glycol and/or 1,4-cyclohexane dimethanol as the diol component. Use of such an aromatic polyester random copolymer resin can impart excellent shrinkability to the heat shrinkable multilayer film.

The lower limit of the glass transition temperature of the polyester resin constituting the front and back layers is preferably 55° C., more preferably 60° C., still more preferably 65° C., and the upper limit thereof is preferably 95° C., more preferably 90° C., still more preferably 85° C.

The polyester resin having a glass transition temperature of 55° C. or higher can prevent the heat shrinkable multilayer film from having an excessively low shrinkage starting temperature, having a high natural shrinkage, and being susceptible to blocking. The polyester resin having a glass transition temperature of 95° C. or lower can prevent the heat shrinkable multilayer film from having reduced low-temperature shrinkability and reduced shrink finish quality, having a large decrease in low-temperature shrinkability with time, and being susceptible to resin whitening during stretching.

The glass transition temperature can be measured by a method in conformity with ISO 3146.

The lower limit of the tensile modulus of the polyester resin constituting the front and back layers is preferably greater than 1000 MPa, and the upper limit thereof is preferably 4000 MPa. The polyester resin having a tensile modulus of greater than 1000 MPa can prevent the heat shrinkable film from having an excessively low shrinkage starting temperature and having a high natural shrinkage. The polyester resin having a tensile modulus of 4000 MPa or smaller can prevent the heat shrinkable multilayer film from having reduced low-temperature shrinkability and reduced shrink finish quality and having a large decrease in low-temperature shrinkability with time. The lower limit of the tensile modulus is more preferably 1500 MPa, and the upper limit thereof is more preferably 3700 MPa.

The tensile modulus can be measured by a method in conformity with ASTM-D882 (Test A).

Examples of commercially available products of the polyester resin for constituting the front and back layers include "Easter", "Embrace LV" (both produced by Eastman Chemical Company), "BELLPET" (produced by Bell Polyester Products, Inc.), and "NOVADURAN" (produced by Mitsubishi Engineering-Plastics Corporation).

The front and back layers each may be constituted by a single polyester resin having the above composition, or a combination of two or more polyester resins each having the above composition.

The front and back layers may optionally contain additives such as antioxidants, heat stabilizers, ultraviolet absorbers, light stabilizers, lubricants, antistatic agents, anti-blocking agents, flame retardants, antimicrobials, fluorescent whitening agents, and colorants.

(Interlayer)

The interlayer contains a polystyrene resin.

Examples of the polystyrene resin include aromatic vinyl hydrocarbon-conjugated diene copolymers, mixed resins of an aromatic vinyl hydrocarbon-conjugated diene copolymer and an aromatic vinyl hydrocarbon-unsaturated aliphatic carboxylate copolymer, and rubber-modified high impact polystyrenes. Using the polystyrene resin allows the heat shrinkable multilayer film of the present invention to start shrinking at low temperature and to have high shrinkability.

The "aromatic vinyl hydrocarbon-conjugated diene copolymer" as used herein means a copolymer containing a component derived from an aromatic vinyl hydrocarbon and a component derived from a conjugated diene.

The aromatic vinyl hydrocarbon is not limited. Examples thereof include styrene, o-methylstyrene, and p-methylstyrene. These may be used alone or in combination of two or more thereof.

The conjugated diene is not limited. Examples thereof include 1,3-butadiene, 2-methyl-1,3-butadiene, 2,3-dimethyl-1,3-butadiene, 1,3-pentadiene, and 1,3-hexadiene. These may be used alone or in combination of two or more thereof.

The aromatic vinyl hydrocarbon-conjugated diene copolymer preferably contains a styrene-butadiene copolymer (SBS resin) for particularly excellent heat shrinkability. To produce a heat shrinkable multilayer film with fewer fish eyes, the aromatic vinyl hydrocarbon-conjugated diene copolymer preferably contains an aromatic vinyl hydrocarbon-conjugated diene copolymer containing 2-methyl-1,3-butadiene (isoprene) as the conjugated diene, such as a styrene-isoprene copolymer (SIS resin) or a styrene-isoprene-butadiene copolymer (SIBS resin).

The aromatic vinyl hydrocarbon-conjugated diene copolymer may contain any one of the SBS resin, SIS resin, and SIBS resin alone, or may contain two or more of them in combination. In the case of using two or more of the SBS resin, SIS resin, and SIBS resin, the resins may be dry-blended with each other, or the resins may be knead-pelletized at a specific composition through an extruder and the obtained compound resin may be used.

The lower limit of the styrene content in 100% by weight of the polystyrene resin is preferably 65% by weight, more preferably 70% by weight, still more preferably 76% by weight, and the upper limit thereof is preferably 90% by weight, more preferably 85% by weight, still more preferably 83% by weight.

The polystyrene resin having a styrene content of 65% by weight or more is less likely to cause impurities such as gel during molding processing, and can sufficiently increase the mechanical strength of the heat shrinkable film. The polystyrene resin having a styrene content of 65% by weight or more can provide good seal strength.

The polystyrene resin having a styrene content of 90% by weight or less can prevent breaking of the heat shrinkable film under tension or during processing such as printing.

The lower limit of the conjugated diene content in 100% by weight of the polystyrene resin is preferably 10% by weight, more preferably 15% by weight, still more preferably 17% by weight, and the upper limit thereof is preferably 35% by weight, more preferably 30% by weight, still more preferably 24% by weight.

The polystyrene resin having a conjugated diene content of 10% by weight or more can prevent breaking of the heat shrinkable film under tension or during processing such as printing.

The polystyrene resin having a conjugated diene content of 35% by weight or less is less likely to cause impurities such as gel during molding processing, and can sufficiently increase the mechanical strength of the heat shrinkable film. Moreover, the polystyrene resin having a conjugated diene content of 35% by weight or less can provide good seal strength.

The lower limit of the Vicat softening temperature of the polystyrene resin is preferably 60° C., more preferably 65° C., still more preferably 67° C., and the upper limit thereof is preferably 85° C., more preferably 80° C., still more preferably 77° C.

The polystyrene resin having a Vicat softening temperature of 60° C. or higher can prevent the heat shrinkable multilayer film from having excessively high low-temperature shrinkability and can prevent the film or the resulting label from wrinkling when attached to a container. The polystyrene resin having a Vicat softening temperature of 85° C. or lower allows the heat shrinkable multilayer film to have good low-temperature shrinkability, preventing the film or the resulting label from remaining partly unshrunk when attached to a container. The Vicat softening temperature can be measured by a method in conformity with ISO 306:1994.

The lower limit of the melt flow rate (MFR) at 200° C. of the polystyrene resin is preferably 2 g/10 min, and the upper limit thereof is preferably 15 g/10 min. An MFR at 200° C. of smaller than 2 g/10 min makes it difficult to form a film. An MFR at 200° C. of greater than 15 g/10 min results in low film mechanical strength, making the film unusable for practical applications. The lower limit of the MFR at 200° C. is more preferably 4 g/10 min, and the upper limit thereof is more preferably 12 g/10 min. The MFR can be measured by a method in conformity with ISO 1133.

Examples of commercially available products of the polystyrene resin for constituting the interlayer include "CLEAREN" (produced by Denka Company Limited.), "Asaflex" (produced by Asahi Kasei Chemicals Corporation), "Styrolux" (produced by BASF), and "PSJ-polystyrene" (produced by PS Japan Corporation).

The interlayer may optionally contain additives such as antioxidants, thermal stabilizers, ultraviolet absorbers, light stabilizers, lubricants, antistatic agents, flame retardants, antimicrobials, fluorescent brighteners, and colorants.

(Adhesive Layer)

In the heat shrinkable multilayer film of the present invention, the front and back layers and the interlayer are stacked with adhesive layers interposed therebetween, where the adhesive layers each contain a polyester resin having a glass transition temperature of 77° C. or lower.

Using such adhesive layers makes it possible to produce a heat shrinkable label that has high seal strength regardless of interlaminar strength while having excellent transparency.

The polyester resin constituting the adhesive layers may be the same as or different from the polyester resin used in the front and back layers described above.

In 100 mol % of the dicarboxylic acid component of the polyester resin constituting the adhesive layers, the lower limit of the amount of a component derived from terephthalic acid is preferably 60 mol %, more preferably 65 mol %, still more preferably 67 mol %, and the upper limit thereof is preferably 100 mol %.

In 100 mol % of the dicarboxylic acid component, the lower limit of the amount of a component derived from isophthalic acid is preferably 0 mol %, and the upper limit thereof is preferably 40 mol %, more preferably 35 mol %, still more preferably 33 mol %.

In 100 mol % of the diol component, the lower limit of the amount of a component derived from ethylene glycol is preferably 50 mol %, more preferably 60 mol %, still more preferably 63 mol %, and the upper limit thereof is preferably 100 mol %.

In 100 mol % of the diol component, the lower limit of the amount of a component derived from diethylene glycol is preferably 0 mol %, and the upper limit thereof is preferably 30 mol %, more preferably 25 mol %, still more preferably 22 mol %.

In 100 mol % of the diol component, the lower limit of the amount of a component derived from 1,4-cyclohexanedimethanol is preferably 0 mol %, and the upper limit thereof is preferably 25 mol %, more preferably 22 mol %, still more preferably 20 mol %.

The polyester resin constituting the adhesive layers has a glass transition temperature of 77° C. or lower.

The polyester resin having a glass transition temperature of 77° C. or lower can provide good seal strength.

The lower limit of the glass transition temperature is preferably 60° C., more preferably 62° C., still more preferably 65° C., and the upper limit thereof is preferably 76° C., more preferably 75° C., still more preferably 73° C.

Preferably, the polyester resin constituting the adhesive layers and the polyester resin constituting the front and back layers have a difference in glass transition temperature of 10° C. or less.

With a difference in glass transition temperature of 10° C. or less, good seal strength can be obtained.

The glass transition temperature can be measured by a method in conformity with ISO 3146.

The lower limit of the polyester resin in each adhesive layer is preferably 4.7% by weight, and the upper limit thereof is preferably 96% by weight.

The polyester resin in an amount within the above range can provide good seal strength.

The lower limit of the amount of the polyester resin is more preferably 47.5% by weight, still more preferably 48% by weight, further preferably 49% by weight, and the upper limit thereof is more preferably 95% by weight, still more preferably 94% by weight, further preferably 93% by weight.

The polystyrene resin constituting the adhesive layers may be the same polystyrene resin as that used in the interlayer described above, or may be a different polystyrene resin. The different polystyrene resin, if used, is preferably more flexible than the polystyrene resin used in the interlayer.

The polystyrene resin constituting the adhesive layers preferably contains an aromatic vinyl hydrocarbon-conjugated diene copolymer, which has particularly excellent adhesion. The polystyrene resin particularly preferably contains a styrene-butadiene copolymer (SBS resin). The styrene-butadiene copolymer, if used, preferably has a higher butadiene content than the styrene-butadiene copolymer used in the interlayer, so as to provide excellent adhesion. To produce a heat shrinkable multilayer film having better adhesion, the polystyrene resin preferably contains an aromatic vinyl hydrocarbon-conjugated diene copolymer containing 2-methyl-1,3-butadiene (isoprene) as the conjugated diene, such as a styrene-isoprene copolymer (SIS resin) or a styrene-isoprene-butadiene copolymer (SIBS resin). The polystyrene resin may also contain a hydrogenated styrene resin obtained by hydrogenating an aromatic vinyl hydrocarbon-conjugated diene copolymer, such as a styrene-butadiene-butylene copolymer (SBBS resin) or a styrene-ethylene-butylene copolymer (SEBS resin), to the extent that the hydrogenated styrene resin does not become a main component of the polystyrene resin. A polystyrene resin containing a hydrogenated styrene resin as a main component tends to reduce transparency.

The polystyrene resin may contain one of the SBS resin, SIS resin, and SIBS resin alone, or two or more of them in combination. When two or more of the SBS resin, SIS resin, SIBS resin, SBBS resin, and SEBS resin are used in combination, the resins may be dry-blended with each other, or the resins may be knead-pelletized at a specific composition through an extruder and the obtained compound resin may be used.

The lower limit of the styrene content in 100% by weight of the polystyrene resin is preferably 50% by weight, more preferably 60% by weight, still more preferably 73% by weight, further preferably 75% by weight, particularly preferably 76% by weight, and the upper limit thereof is preferably 98% by weight, more preferably 95% by weight, still more preferably 93% by weight, further preferably 92% by weight, particularly preferably 90% by weight.

The polystyrene resin having a styrene content of 50% by weight or more can prevent formation of impurities such as gel during molding processing. The polystyrene resin having a styrene content of 98% by weight or less can sufficiently improve the interlaminar strength.

The lower limit of the butadiene content in 100% by weight of the polystyrene resin is preferably 2% by weight, more preferably 5% by weight, still more preferably 7% by weight, further preferably 8% by weight, particularly preferably 10% by weight, and the upper limit thereof is preferably 50% by weight, more preferably 40% by weight, still more preferably 27% by weight, further preferably 25% by weight, particularly preferably 24% by weight.

The polystyrene resin having a butadiene content of 2% by weight or more can sufficiently improve the interlaminar strength. The polystyrene resin having a butadiene content of 50% by weight or less can prevent formation of impurities such as gel during molding processing.

The lower limit of the Vicat softening temperature of the polystyrene resin constituting the adhesive layers is preferably 30° C., more preferably 40° C., still more preferably 42° C., particularly preferably 45° C., and the upper limit thereof is preferably 85° C., more preferably 80° C., still more preferably 77° C., particularly preferably 75° C.

The polystyrene resin having a Vicat softening temperature of 30° C. or higher can prevent the delamination of the heat shrinkable multilayer film caused by heating during attachment to a container. The polystyrene resin having a Vicat softening temperature of 85° C. or lower can further improve the adhesion strength of the heat shrinkable multilayer film.

The Vicat softening temperature can be measured by a method in conformity with ISO 306.

The lower limit of the melt flow rate (MFR) at 200° C. of the polystyrene resin constituting the adhesive layers is preferably 2 g/10 min, and the upper limit thereof is preferably 15 g/10 min. The polystyrene resin having an MFR at 200° C. of smaller than 2 g/10 min may stagnate in an extruder during a continuous production process, and tends to form impurities such as gel. The polystyrene resin having an MFR at 200° C. of greater than 15 g/10 min may fail to receive sufficient pressure during a film forming process, and thus tends to cause great thickness variation. The lower limit of the MFR at 200° C. is more preferably 4 g/10 min and the upper limit thereof is more preferably 12 g/10 min. The MFR can be measured by a method in conformity with ISO 1133.

The lower limit of the amount of the polystyrene resin in each adhesive layer is preferably 2% by weight and the upper limit thereof is preferably 95% by weight.

The polystyrene resin in an amount within the above range can provide good seal strength.

The lower limit of the amount of the polystyrene resin is more preferably 2.5% by weight, still more preferably 3% by weight, further preferably 4% by weight, and the upper limit thereof is more preferably 47.5% by weight, still more preferably 47% by weight, further preferably 46% by weight.

The polyester elastomer used in the adhesive layers contains a polyester as a hard segment and a polyether or polyester as a soft segment having high rubber elasticity.

Examples of the polyester as a hard segment include aromatic polyesters.

Examples of the polyester as a soft segment include aliphatic polyesters.

Examples of the polyether as a soft segment include aliphatic polyethers such as polyalkylene ether glycol.

Preferred among these are a block copolymer containing an aromatic polyester as a hard segment and an aliphatic polyether as a soft segment and a block copolymer containing an aromatic polyester as a hard segment and an aliphatic polyester as a soft segment. More preferred is a block copolymer containing an aromatic polyester as a hard segment and polyalkylene ether glycol as a soft segment.

When the polyester elastomer used is a block copolymer containing an aromatic polyester and a polyalkylene ether glycol, the lower limit of the proportion of the segment constituted by the polyalkylene ether glycol is preferably 5% by weight, and the upper limit thereof is preferably 90% by weight. When the proportion is less than 5% by weight, the adhesion to the interlayer is decreased. When the proportion is more than 90% by weight, the adhesion to the front and back layers is decreased. The lower limit is more preferably 30% by weight, and the upper limit is more preferably 80% by weight. The lower limit is still more preferably 55% by weight.

Examples of the polyalkylene ether glycol include polyethylene glycol, poly(propylene ether)glycol, poly(tetramethylene ether)glycol, and poly(hexamethylene ether)glycol.

The lower limit of the number average molecular weight of the polyalkylene ether glycol is preferably 400, and the upper limit thereof is preferably 6000. The lower limit is more preferably 600, and the upper limit is more preferably 4000. The lower limit is still more preferably 1000, and the upper limit is still more preferably 3000. Use of a polyalkylene ether glycol with a number average molecular weight within the above range is preferred because it can provide favorable interlaminar strength. The number average molecular weight herein is determined by gel permeation chromatography (GPC).

The polyester elastomer may be produced by any method. For example, it may be produced as follows: an oligomer is obtained by esterification reaction or transesterification reaction using, as raw materials, (i) a C2-C12 aliphatic and/or alicyclic diol, (ii) an aromatic dicarboxylic acid and/or an alicyclic dicarboxylic acid or an ester thereof, and (iii) a polyalkylene ether glycol having a number average molecular weight of 400 to 6000, and then the oligomer is subjected to polycondensation.

Examples of the C2-C12 aliphatic and/or alicyclic diol that can be used include those commonly used as raw materials of polyesters, especially as raw materials of polyester thermoplastic elastomers. Specific examples thereof include ethylene glycol, propylene glycol, trimethylene glycol, 1,4-butanediol, 1,4-cyclohexanediol, and 1,4-cyclohexanedimethanol. Preferred among these are ethylene glycol and 1,4-butanediol. More preferred is 1,4-butanediol. These may be used alone or in combination of two or more thereof.

Examples of the aromatic dicarboxylic acid and/or alicyclic dicarboxylic acid that can be used include those commonly used as raw materials of polyesters, especially as raw materials of polyester thermoplastic elastomers. Specific examples thereof include terephthalic acid, isophthalic acid, phthalic acid, 2,6-naphthalenedicarboxylic acid, and cyclohexanedicarboxylic acid. Preferred among these are terephthalic acid and 2,6-naphthalenedicarboxylic acid. More preferred is terephthalic acid. These may be used alone or in combination of two or more thereof.

Examples of commercially available products of the polyester elastomers include tradename "PRIMALLOY" (produced by Mitsubishi Chemical Corporation), tradename "PELPRENE" (produced by Toyobo Co., Ltd.), and tradename "Hytrel" (produced by Du Pont-Toray Co., Ltd.).

The polyester elastomer preferably has a melting point of 120° C. to 200° C. The polyester elastomer having a melting point of lower than 120° C. may decrease the heat resistance, so that separation easily occurs from the solvent seal portion when the heat shrinkable film is attached to a container as a heat shrinkable label. The polyester elastomer having a melting point of higher than 200° C. may not provide sufficient adhesion strength. The lower limit is more preferably 130° C., and the upper limit is more preferably 190° C.

The melting point can be measured by a method in conformity with ISO 3146 using a differential scanning calorimeter (produced by Shimadzu Corporation, DSC-60).

The melting point of the polyester elastomer is affected by the copolymerization ratio between the polyester as a hard segment and the polyether or polyester as a soft segment, and the structure. The melting point of the polyester elastomer usually tends to depend on the copolymerization amount of the polyether or polyester as a soft segment. A larger copolymerization amount of the polyether or polyester leads to a lower melting point, whereas a smaller copolymerization amount thereof leads to a higher melting point.

The melting point of the polyester as a hard segment constituting the polyester elastomer may be adjusted by changing the copolymerization components of the polyester, and thereby the melting point of the entire polyester elastomer may be adjusted.

Decreasing the molecular weight of the polyether or polyester as a soft segment decreases the blockiness of the resulting polyester elastomer, and thus tends to decrease the melting point.

The lower limit of the durometer hardness of the polyester elastomer is preferably 10, and the upper limit thereof is preferably 80. The polyester elastomer having a durometer hardness of 10 or more can improve the mechanical strength of the adhesive layers. The polyester elastomer having a durometer hardness of 80 or less can improve the flexibility and impact resistance of the adhesive layers. The lower limit of the durometer hardness is more preferably 15, and the upper limit thereof is more preferably 70. The lower limit is still more preferably 20, and the upper limit is still more preferably 60.

The durometer hardness can be measured by a method in conformity with ISO 18517 using a durometer (type D).

The lower limit of the specific gravity of the polyester elastomer is preferably 0.95, and the upper limit thereof is preferably 1.20. The polyester elastomer having a specific gravity of 0.95 or higher can impart heat resistance and can reduce the separation occurring from the solvent seal portion when the heat shrinkable multilayer film is attached to a container as a heat shrinkable label. The polyester elastomer having a specific gravity of 1.20 or lower can increase the adhesion strength between the front layer and the interlayer and between the back layer and the interlayer.

The lower limit of the specific gravity is more preferably 0.98, and the upper limit thereof is more preferably 1.18.

The specific gravity can be measured by a method in conformity with ASTM D 792 using a water displacement method.

The lower limit of the tensile modulus of the polyester elastomer constituting the adhesive layers is preferably 1 MPa, and the upper limit thereof is preferably 1000 MPa. The polyester elastomer having a tensile modulus of less than 1 MPa tends to reduce the mechanical strength of the adhesive layers. The polyester elastomer having a tensile modulus of more than 1000 MPa tends to reduce the adhesion strength between the front and back layers and the interlayer. The lower limit of the tensile modulus is more preferably 5 MPa, and the upper limit thereof is more preferably 900 MPa. The tensile modulus can be measured in accordance with ASTM-882 (Test A).

The lower limit of the glass transition temperature of the polyester elastomer constituting the adhesive layers is preferably −70° C., more preferably −35° C., still more preferably −30° C., and the upper limit thereof is preferably 55° C., more preferably 53° C., still more preferably 50° C.

The polyester elastomer having a glass transition temperature of −70° C. or higher can reduce the occurrence of resin blocking, leading to good handleability. The polyester elastomer having a glass transition temperature of 55° C. or lower can provide good adhesion strength between the front and back layers and the interlayer.

The glass transition temperature of the polyester elastomer can be calculated from a tan δ peak obtained by a method in conformity with ISO 6721-4.

The polyester elastomer may be a modified product. Examples of the modified product include a modified polyester elastomer obtained by grafting an α,β-ethylenically unsaturated carboxylic acid to the polyester elastomer.

Examples of the α,β-ethylenically unsaturated carboxylic acid include: unsaturated carboxylic acids such as acrylic acid, maleic acid, fumaric acid, tetrahydrofumaric acid, itaconic acid, citraconic acid, crotonic acid, and isocrotonic acid; and unsaturated carboxylic anhydrides such as 2-octen-1-yl succinic anhydride, 2-dodecen-1-yl succinic anhydride, 2-octadecen-1-yl succinic anhydride, maleic anhydride, 2,3-dimethylmaleic anhydride, bromomaleic anhydride, dichloromaleic anhydride, citraconic anhydride, itaconic anhydride, 1-butene-3,4-dicarboxylic anhydride, 1-cyclopentene-1,2-dicarboxylic anhydride, 1,2,3,6-tetrahydrophthalic anhydride, 3,4,5,6-tetrahydrophthalic anhydride, exo-3,6-epoxy-1,2,3,6-tetrahydrophthalic anhydride, 5-norbornene-2,3-dicarboxylic anhydride, methyl-5-norbornene-2,3-dicarboxylic anhydride, endo-bicyclo[2.2.2]oct-5-ene-2,3-dicarboxylic anhydride, and bicyclo[2.2.2]oct-7-ene-2,3,5,6-tetracarboxylic anhydride. Preferred among these are acid anhydrides because they have high reactivity.

The lower limit of the amount of the polyester elastomer in each adhesive layer is preferably 0.3% by weight, and the upper limit thereof is preferably 80% by weight.

The polyester elastomer in an amount within the above range can provide good seal strength.

The lower limit of the amount of the polyester elastomer is more preferably 0.5% by weight, still more preferably 0.7% by weight, further preferably 0.8% by weight, and the upper limit thereof is more preferably 28% by weight, still more preferably 27% by weight, further preferably 26% by weight.

The adhesive layers may optionally contain additives such as antioxidants, heat stabilizers, ultraviolet absorbers, light stabilizers, lubricants, antistatic agents, flame retardants, antimicrobials, fluorescent brighteners, and colorants.

(Film)

The lower limit of the overall thickness of the heat shrinkable multilayer film of the present invention is preferably 10 μm, and the upper limit thereof is preferably 100 μm. The lower limit is more preferably 15 μm, and the upper limit is more preferably 80 μm. The lower limit is still more preferably 20 μm, and the upper limit is still more preferably 70 μm. The heat shrinkable multilayer film having an overall thickness within the above range can be excellent in heat shrinkability, convertibility (e.g., printability, center sealing properties), and attachability.

In the heat shrinkable multilayer film of the present invention, the lower limit of the thickness of each of the front and back layers relative to the overall thickness of the heat shrinkable multilayer film is preferably 5%, and the upper limit thereof is preferably 25%. The lower limit of the thickness of the interlayer relative to the overall thickness of the heat shrinkable multilayer film is preferably 50%, and the upper limit thereof is preferably 90%. The front and back layers and the interlayer having thicknesses within the above ranges provide high interlaminar strength, high transparency, and the like.

In the heat shrinkable multilayer film of the present invention, the lower limit of the thickness of each adhesive layer is preferably 0.3 μm and the upper limit thereof is preferably 3.0 μm. The adhesive layer having a thickness of smaller than 0.3 μm may fail to provide sufficient adhesion. The adhesive layer having a thickness of greater than 3.0 μm may deteriorate the heat shrinkage properties and optical characteristics of the heat shrinkable multilayer film. The lower limit of the thickness of each adhesive layer is more preferably 0.5 μm and the upper limit thereof is more preferably 2.0 μm.

The overall thickness of the heat shrinkable multilayer film can be adjusted by subtracting the thickness of the adhesive layers and then adjusting the thickness of the front and back layers and the thickness of the interlayer.

For example, when the heat shrinkable multilayer film of the present invention has a five-layer structure of front layer (A)/adhesive layer (E)/interlayer (B)/adhesive layer (E)/back layer (C) and the heat shrinkable multilayer film has an overall thickness of 40 μm, the front layer (A) and the back layer (C) each preferably has a thickness of 2.0 to 10.0 μm, more preferably 3.0 to 8.0 μm. The adhesive layers (E) each preferably have a thickness of 0.3 to 3.0 μm, more preferably 0.5 to 2.0 μm. The interlayer (B) preferably has a thickness of 19.0 to 35.4 μm, more preferably 20.0 to 33.0 μm.

The heat shrinkable multilayer film of the present invention may include adhesive layer (E)/interlayer (B)/adhesive layer (E) units repeated between the front layer (A) and the back layer (C), for example as in the structure of front layer (A)/adhesive layer (E)/interlayer (B)/adhesive layer (E)/interlayer (B)/adhesive layer (E)/interlayer (B)/adhesive layer (E)/back layer (C). When the heat shrinkable multilayer film has an overall thickness of 40 μm, the front layer (A) and the back layer (C) each preferably have a thickness of 2.0 to 10.0 μm, more preferably 3.0 to 8.0 μm. The adhesive layers (E) preferably have a total thickness of 1.0 to 10.0 μm, more preferably 1.5 to 8.0 μm. The interlayers (B) preferably have a total thickness of 18.0 to 34.0 μm, more preferably 19.0 to 31.0 μm.

The adhesive layer (E)/interlayer (B)/adhesive layer (E) units may be repeated between the front layer (A) and the back layer (C) by extruding resins from multiple extruders and combining them in a feedblock, or by first combining resins to form an adhesive layer (E)/interlayer (B)/adhesive layer (E) unit and then forming repeating units using a multiplier.

The adhesive layer (E)/interlayer (B)/adhesive layer (E) units repeated between the front layer (A) and the back layer (C) can distribute stress when the label experiences a shock, thus reducing separation.

The shrinkage in the main shrinkage direction of the heat shrinkable multilayer film of the present invention after immersing in warm water at 70° C. for 10 seconds is preferably 5 to 50%, more preferably 8 to 47%, still more preferably 10 to 45%, particularly preferably 15 to 45%; after immersing in warm water at 80° C. for 10 seconds, preferably 35 to 70%, more preferably 38 to 69%, still more preferably 41 to 68%, particularly preferably 43 to 67%; and after immersing in boiling water for 10 seconds, preferably 65 to 85%, more preferably 68 to 83%, still more preferably 70 to 82%. Such a shrinkage enables excellent shrink finish quality in a hot air tunnel or a steam tunnel.

In the heat shrinkable multilayer film of the present invention, the lower limit of the interlaminar strength at room temperature in a direction (MD) perpendicular to the main shrinkage direction (TD) is preferably 0.05 N/10 mm, more preferably 0.1 N/10 mm, and the upper limit thereof is preferably 15 N/10 mm, more preferably 10 N/10 mm.

In the heat shrinkable multilayer film of the present invention, the lower limit of the interlaminar strength in the main shrinkage direction (TD) is preferably 0.05 N/10 mm, more preferably 0.1 N/10 mm, and the upper limit thereof is preferably 15 N/10 mm, more preferably 10 N/10 mm.

In the heat shrinkable multilayer film of the present invention, the lower limit of seal strength is preferably 2.35 N/10 mm, more preferably 2.4 N/10 mm, and the upper limit thereof is preferably 15 N/10 mm, more preferably 10 N/10 mm.

The heat shrinkable multilayer film of the present invention may be produced by any method, and is preferably produced by simultaneously forming all the layers by a co-extrusion method. When the co-extrusion method is co-extrusion using a T-die, the layers may be stacked by a feed block technique, a multi-manifold technique, or a combination thereof.

Specifically, for example, the heat shrinkable multilayer film of the present invention may be produced by feeding the raw materials to constitute the front and back layers, the interlayer, and the adhesive layers into extruders, extruding them into a sheet through a multilayer die, and cooling and solidifying the sheet on a take-up roll, followed by uniaxial or biaxial stretching.

The stretching can be performed by, for example, a roll stretching method, a tenter stretching method, or a combination thereof. The stretching temperature is adjusted according to the softening temperatures of the resins constituting the film or the shrinkage properties required of the heat shrinkable multilayer film. The lower limit of the stretching temperature is preferably 65° C., and the upper limit thereof is preferably 120° C. The lower limit is more preferably 70° C., and the upper limit is more preferably 115° C. The stretching ratio in the main shrinkage direction is changed according to the resins constituting the film, the stretching means, the stretching temperature, and the like. The stretching ratio is preferably 3 times or more, more preferably 4 times or more and is preferably 7 times or less, more preferably 6.5 times or less. With such stretching temperature and stretching ratio, the film can achieve excellent thickness precision, and also can prevent the delamination that causes only the front or back layer on the inner side to be left on the container when the film is torn along the perforation.

The heat shrinkable multilayer film of the present invention can be used in any application. The heat shrinkable multilayer film of the present invention makes it possible to produce a heat shrinkable label having high seal strength regardless of interlaminar strength, and also has high transparency. Thus, for example, the heat shrinkable multilayer film can be suitably used as a base film of a heat shrinkable label to be attached to a container such as a plastic bottle or a metal can. The heat shrinkable label including the heat shrinkable multilayer film of the present invention is also encompassed by the present invention.

Advantageous Effects of Invention

The present invention can provide a heat shrinkable multilayer film that makes it possible to produce a heat shrinkable label having high seal strength regardless of interlaminar strength, and that also has excellent transparency. The present invention can also provide a heat shrinkable label including the heat shrinkable multilayer film.

DESCRIPTION OF EMBODIMENTS

Figure 1:
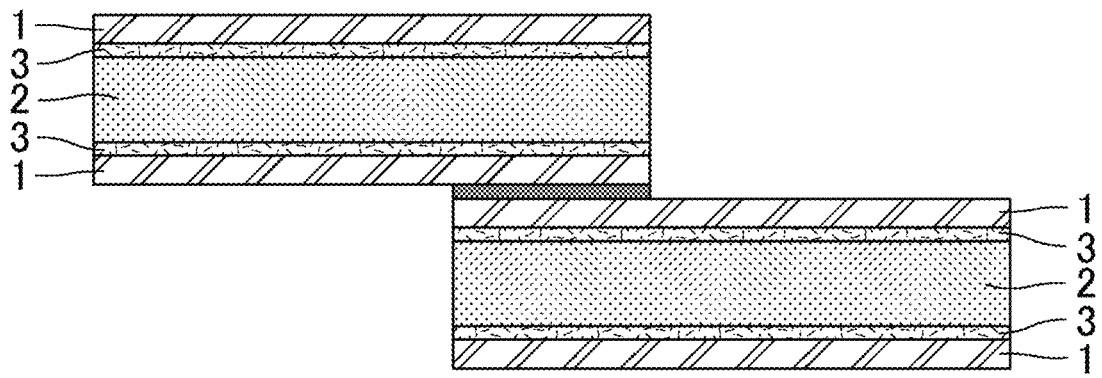
FIG. 1 is a schematic view of a solvent seal portion of a heat shrinkable label.
Figure 2:
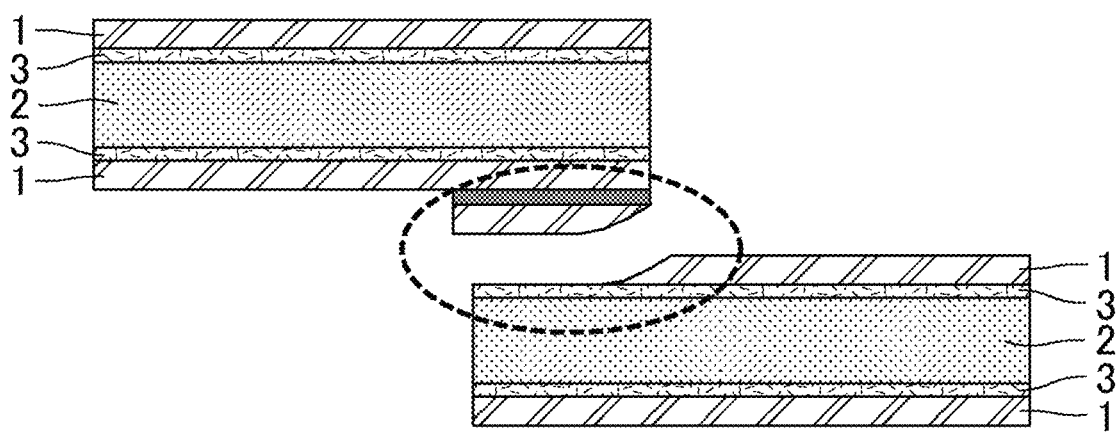
FIG. 2 is a schematic view of a separation state of a solvent seal portion.

The following will describe the present invention in detail referring to examples, but the present invention should not be limited to these examples.

The materials used in examples and comparative examples are listed below.
(Polyester Resin)
PET-1: aromatic polyester copolymer (glass transition temperature 69° C.), containing 100 mol % of a component derived from terephthalic acid as a dicarboxylic acid component and containing 65 mol % of a component derived from ethylene glycol, 20 mol % of a component derived from diethylene glycol, and 15 mol % of a component derived from 1,4-cyclohexanedimethanol as diol components.

PET-2: aromatic polyester copolymer (glass transition temperature 70° C.), containing 70 mol % of a component derived from terephthalic acid and 30 mol % of a component derived from isophthalic acid as dicarboxylic acid components, and containing 100 mol % of a component derived from ethylene glycol as a diol component.

PET-3: aromatic polyester copolymer (glass transition temperature 72° C.), containing 100 mol % of a component derived from terephthalic acid as a dicarboxylic acid component and containing 70 mol % of a component derived from ethylene glycol, 10 mol % of a component derived from diethylene glycol, and 20 mol % of a component derived from 1,4-cyclohexanedimethanol as diol components.

PET-4: aromatic polyester copolymer (glass transition temperature 82° C.), containing 100 mol % of a component derived from terephthalic acid as a dicarboxylic acid component and containing 70 mol % of a component derived from ethylene glycol and 30 mol % of a component derived from 1,4-cyclohexanedimethanol as diol components.
(Polystyrene Resin)
PS-1: styrene-butadiene block copolymer (styrene component 76% by weight, butadiene component 24% by weight, Vicat softening temperature 70° C., MFR 8 g/10 min)
PS-2: styrene-butadiene block copolymer (styrene component 78% by weight, butadiene component 22% by weight, Vicat softening temperature 72° C., MFR 7 g/10 min)
(Polyester Elastomer)
TPE-1: non-modified polyester-polyether block copolymer containing a polyester as a hard segment and a polyether as a soft segment (produced by Du Pont-Toray Co., Ltd., Hytrel 2521, durometer hardness 55, glass transition temperature 45° C.)

Example 1

An amount of 100% by weight of the polyester resin (PET-1) was used as a resin to constitute the front and back layers.

An amount of 100% by weight of the polystyrene resin (PS-2) was used as a resin to constitute the interlayer.

An amount of 75% by weight of the polyester resin (PET-1), 20% by weight of the polystyrene resin (PS-1), and 5% by weight of the polyester elastomer (TPE-1) were used as resins to constitute the adhesive layers.

They were fed into extruders having a barrel temperature of 160° C. to 250° C., extruded into a five-layer sheet through a multilayer die at 250° C., and cooled and solidified on a take-up roll at 30° C. Subsequently, the sheet was stretched at stretching ratio of 6 times in a tenter stretching machine with a preheating zone set at 105° C., a stretching zone set at 90° C., and a heat setting zone set at 85° C., and then wound with a winder. Thus, a heat shrinkable multilayer film was obtained in which the direction perpendicular to the main shrinkage direction was the MD and the main shrinkage direction was the TD.

The obtained heat shrinkable multilayer film had a total thickness of 40 μm and had a five-layer structure (front or back layer (5.5 μm)/adhesive layer (0.9 μm)/interlayer (27.2 μm)/adhesive layer (0.9 μm)/front or back layer (5.5 μm)).

Example 2

An amount of 75% by weight of the polyester resin (PET-2), 20% by weight of the polystyrene resin (PS-1), and 5% by weight of the polyester elastomer (TPE-1) were used as the resins to constitute the adhesive layers.

Otherwise, the procedure was performed in the same manner as in Example 1, whereby a five layer-structure heat shrinkable multilayer film was obtained.

Example 3

An amount of 75% by weight of the polyester resin (PET-3), 20% by weight of the polystyrene resin (PS-1), and 5% by weight of the polyester elastomer (TPE-1) were used as the resins to constitute the adhesive layers.

Otherwise, the procedure was performed in the same manner as in Example 1, whereby a five layer-structure heat shrinkable multilayer film was obtained.

Example 4

An amount of 50% by weight of the polyester resin (PET-1), 45% by weight of the polystyrene resin (PS-1), and 5% by weight of the polyester elastomer (TPE-1) were used as the resins to constitute the adhesive layers.

Otherwise, the procedure was performed in the same manner as in Example 1, whereby a five layer-structure heat shrinkable multilayer film was obtained.

Example 5

An amount of 90% by weight of the polyester resin (PET-1), 5% by weight of the polystyrene resin (PS-1), and 5% by weight of the polyester elastomer (TPE-1) were used as the resins to constitute the adhesive layers.

Otherwise, the procedure was performed in the same manner as in Example 1, whereby a five layer-structure heat shrinkable multilayer film was obtained.

Example 6

An amount of 85% by weight of the polyester resin (PET-1), 10% by weight of the polystyrene resin (PS-1), and 5% by weight of the polyester elastomer (TPE-1) were used as the resins to constitute the adhesive layers.

Otherwise, the procedure was performed in the same manner as in Example 1, whereby a five layer-structure heat shrinkable multilayer film was obtained.

Example 7

An amount of 79% by weight of the polyester resin (PET-1), 20% by weight of the polystyrene resin (PS-1), and 1% by weight of the polyester elastomer (TPE-1) were used as the resins to constitute the adhesive layers.

Otherwise, the procedure was performed in the same manner as in Example 1, whereby a five layer-structure heat shrinkable multilayer film was obtained.

Example 8

An amount of 77% by weight of the polyester resin (PET-1), 20% by weight of the polystyrene resin (PS-1), and 3% by weight of the polyester elastomer (TPE-1) were used as the resins to constitute the adhesive layers.

Otherwise, the procedure was performed in the same manner as in Example 1, whereby a five layer-structure heat shrinkable multilayer film was obtained.

Example 9

An amount of 55% by weight of the polyester resin (PET-1), 20% by weight of the polystyrene resin (PS-1), and 25% by weight of the polyester elastomer (TPE-1) were used as the resins to constitute the adhesive layers.

Otherwise, the procedure was performed in the same manner as in Example 1, whereby a five layer-structure heat shrinkable multilayer film was obtained.

Comparative Example 1

An amount of 75% by weight of the polyester resin (PET-4), 20% by weight of the polystyrene resin (PS-1), and 5% by weight of the polyester elastomer (TPE-1) were used as the resins to constitute the adhesive layers.

Otherwise, the procedure was performed in the same manner as in Example 1, whereby a five layer-structure heat shrinkable multilayer film was obtained.
(Evaluation)

Figure 3:
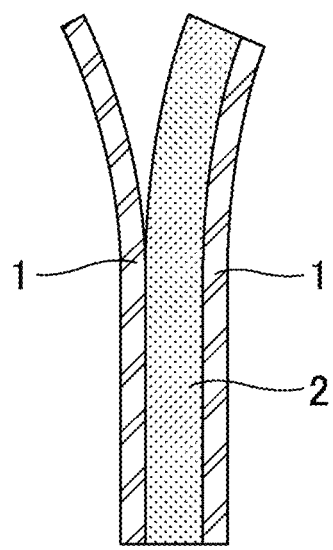
FIG. 3 is a schematic view illustrating a film peel method in interlaminar strength evaluation.
Figure 4:
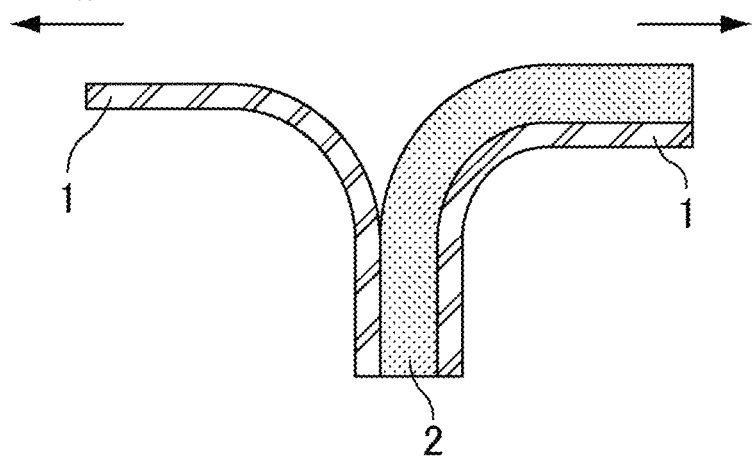
FIG. 4 is a schematic view illustrating a film peel method in interlaminar strength evaluation.

The heat shrinkable multilayer films obtained in the examples and the comparative examples were evaluated as follows. Table 1 shows the structures of the heat shrinkable multilayer films and the evaluation results.
(1) Delamination Strength The heat shrinkable multilayer film was cut to a size of 100 mm in length×10 mm in width. The film was delaminated at part of a film end as shown in FIG. 3, followed by peeling in the 180° direction at a tensile speed of 200 mm/min as shown in FIG. 4 to measure the strength using Adhesion and Peeling Resistance Tester (HEIDON TYPE 17, produced by Shinto Scientific Co., Ltd.). Here, in each of the examples and comparative examples, the delamination strength was determined by measuring the delamination strength in TD and MD of four specimens and calculating the averages in TD and MD.
(2) Seal Strength Two ends of the heat shrinkable multilayer film were bonded to each other using a solvent mixture of 100 parts by weight of 1,3-dioxolane and 30 parts by weight of cyclohexane. The 10-mm-wide area where the film ends were bonded, that is, a seal portion, was cut to a size of 100 mm in length×10 mm in width. The two adherends of the seal portion were partially peeled from each other, followed by peeling in the 180° direction at a tensile speed of 200 mm/min to measure the strength using Adhesion and Peeling Resistance Tester (HEIDON TYPE 17, produced by Shinto Scientific Co., Ltd.). Here, in each of the examples and comparative examples, the seal strength was determined by measuring the seal strength in TD of four specimens and calculating the average. The seal strength was evaluated in accordance with the following criteria.
Good: The seal strength was 2.4 N/10 mm or greater.
Poor: The seal strength was smaller than 2.4 N/10 mm.

The relation of the seal strength with the delamination strength was evaluated in accordance with the following criteria.
Good: The delamination strength in either TD or MD was 0.5 N/10 mm or smaller, and the seal strength was 2.4 N/10 mm or greater.

Fair: The delamination strength in both TD and MD was greater than 0.5 N/10 mm, and the seal strength was 2.4 N/10 mm or greater.
Poor: The seal strength was smaller than 2.4 N/10 mm.
(3) Haze The haze of the obtained heat shrinkable multilayer film was measured using NDH 5000 (produced by Nippon Denshoku Industries Co., Ltd.) by a method in conformity with JIS K 7136, and evaluated in accordance with the following criteria.
Good: The haze was smaller than 6%.
Poor: The haze was 6% or greater.

ency. The present invention can also provide a heat shrinkable label including the heat shrinkable multilayer film.

REFERENCE SIGNS LIST 1 front or back layer
2 interlayer
3 adhesive layer

The invention claimed is:
1. A heat shrinkable multilayer film comprising:
front and back layers each containing a polyethyleneterephthalate resin;

TABLE 1

| | | | | Example 1 | Example 2 | Example 3 | Example 4 | Example 5 |
|---|---|---|---|---|---|---|---|---|
| Constituent resin (% by weight) | Front and back layers | Polyester resin | PET-1 | 100 | 100 | 100 | 100 | 100 |
| | Interlayer | Polystyrene resin | PS-2 | 100 | 100 | 100 | 100 | 100 |
| | Adhesive layer | Polystyrene resin | PS-1 | 20 | 20 | 20 | 45 | 5 |
| | | Polyester elastomer | TPE-1 | 5 | 5 | 5 | 5 | 5 |
| | | Polyester resin | PET-1 | 75 | — | — | 50 | 90 |
| | | | PET-2 | — | 75 | — | — | — |
| | | | PET-3 | — | — | 75 | — | — |
| | | | PET-4 | — | — | — | — | — |
| | | Dicarboxylic acid (mol %) | Terephthalic acid | 100 | 70 | 100 | 100 | 100 |
| | | | Isophthalic acid | — | 30 | — | — | — |
| | | Diol (mol %) | Ethylene glycol | 65 | 100 | 70 | 65 | 65 |
| | | | Diethylene glycol | 20 | — | 10 | 20 | 20 |
| | | | 1.4-Cyclohexanedimethanol | 15 | — | 20 | 15 | 15 |
| | | | Glass transition temperature (° C.) | 69 | 70 | 72 | 69 | 69 |
| Evaluation | Delamination strength (N/10 mm) | | MD | 0.9 | 0.9 | 0.4 | 0.8 | 0.3 |
| | | | TD | 0.9 | 0.9 | 0.4 | 0.8 | 0.4 |
| | Seal strength (N/10 mm) | | N/10 mm | 3.5 | 4.0 | 3.6 | 4.1 | 2.5 |
| | | | Evaluation | Good | Good | Good | Good | Good |
| | | | Relation with delamination strength | Fair | Fair | Good | Fair | Fair |
| | | | Haze (%) | 4.2 | 4.8 | 4.9 | 5.5 | 4.2 |
| | | | | Good | Good | Good | Good | Good |

| | | | | Example 6 | Example 7 | Example 8 | Example 9 | Comparative Example 1 |
|---|---|---|---|---|---|---|---|---|
| Constituent resin (% by weight) | Front and back layers | Polyester resin | PET-1 | 100 | 100 | 100 | 100 | 100 |
| | Interlayer | Polystyrene resin | PS-2 | 100 | 100 | 100 | 100 | 100 |
| | Adhesive layer | Polystyrene resin | PS-1 | 10 | 20 | 20 | 20 | 20 |
| | | Polyester elastomer | TPE-1 | 5 | 1 | 3 | 25 | 5 |
| | | Polyester resin | PET-1 | 85 | 79 | 77 | 55 | — |
| | | | PET-2 | — | — | — | — | — |
| | | | PET-3 | — | — | — | — | — |
| | | | PET-4 | — | — | — | — | 75 |
| | | Dicarboxylic acid (mol %) | Terephthalic acid | 100 | 100 | 100 | 100 | 100 |
| | | | Isophthalic acid | — | — | — | — | — |
| | | Diol (mol %) | Ethylene glycol | 65 | 65 | 65 | 65 | 70 |
| | | | Diethylene glycol | 20 | 20 | 20 | 20 | — |
| | | | 1.4-Cyclohexanedimethanol | 15 | 15 | 15 | 15 | 30 |
| | | | Glass transition temperature (° C.) | 69 | 69 | 69 | 69 | 82 |
| Evaluation | Delamination strength (N/10 mm) | | MD | 0.8 | 0.4 | 0.8 | 1.0 | 0.4 |
| | | | TD | 0.8 | 0.8 | 0.8 | 1.0 | 0.3 |
| | Seal strength (N/10 mm) | | N/10 mm | 4.1 | 2.4 | 3.2 | 4.5 | 2.3 |
| | | | Evaluation | Good | Good | Good | Good | Poor |
| | | | Relation with delamination strength | Fair | Good | Fair | Fair | Poor |
| | | | Haze (%) | 4.6 | 4.5 | 4.1 | 5.6 | 5.5 |
| | | | | Good | Good | Good | Good | Good |

INDUSTRIAL APPLICABILITY

The present invention can provide a heat shrinkable multilayer film that makes it possible to produce a heat shrinkable label having high seal strength regardless of interlaminar strength, and that also has excellent transparan interlayer containing a polystyrene resin; and
adhesive layers,
wherein the front and back layers and the interlayer are stacked with the adhesive layers interposed therebetween, and the adhesive layers each contain a polyester resin having a glass transition temperature of 65° C. or higher and 73° C. or lower, the adhesive layers each contain 4 to 45% by weight of a polystyrene resin, 49 to 93% by weight of the polyester resin, and 0.8 to 26% by weight of a polyester elastomer, the polyester resin constituting the adhesive layers contains a dicarboxylic acid component and a diol component, wherein the polyester resin constituting the adhesive layers contains 67 to 100 mol % of a component derived from terephthalic acid and 0 to 33 mol % of a component derived from isophthalic acid in 100 mol % of the dicarboxylic acid component, and contains 63 to 100 mol % of a component derived from ethylene glycol, 0 to 22 mol % of a component derived from diethylene glycol, and 0 to 20 mol % of a component derived from 1,4-cyclohexanedimethanol in 100 mol % of the diol component, the polystyrene resin constituting the adhesive layers is a styrene butadiene copolymer, wherein a styrene content in 100% by weight of the polystyrene resin constituting the adhesive layers is 50 to 98% by weight and a butadiene content in 100% by weight of the polystyrene resin constituting the adhesive layers is 2 to 50% by weight, and the polyester elastomer constituting the adhesive layers contains a polyester as a hard segment and a polyether as a soft segment.

2. A heat shrinkable label comprising the heat shrinkable multilayer film according to claim 1.

* * * * *